United States Patent
Nose et al.

(10) Patent No.: US 7,575,787 B2
(45) Date of Patent: Aug. 18, 2009

(54) LIQUID CRYSTAL COMPOSITION, LIQUID CRYSTAL DISPLAY ELEMENT USING THE SAME, AND ELECTRONIC PAPER INCLUDING THE SAME

(75) Inventors: Masaki Nose, Kawasaki (JP); Junji Tomita, Kawasaki (JP); Yoshihisa Kurosaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/967,375

(22) Filed: Dec. 31, 2007

(65) Prior Publication Data

US 2008/0099723 A1 May 1, 2008

Related U.S. Application Data

(63) Continuation of application No. PCT/JP2005/012237, filed on Jul. 1, 2005.

(30) Foreign Application Priority Data

Jul. 1, 2005 (JP) ............................. 2005/012237

(51) Int. Cl.
*C09K 19/52* (2006.01)
*G02F 1/133* (2006.01)
*G09G 3/36* (2006.01)

(52) U.S. Cl. .................... 428/1.1; 349/175; 349/176; 349/179; 345/87; 345/88; 252/299.01

(58) Field of Classification Search .................. 428/1.1; 349/175, 176, 179; 345/87, 88; 252/299.01
See application file for complete search history.

(56) References Cited

U.S. PATENT DOCUMENTS 6,094,244 A * 7/2000 Kawata et al. ............... 349/74

(Continued)

FOREIGN PATENT DOCUMENTS

JP 2003-147363 A 5/2003

(Continued)

OTHER PUBLICATIONS

International Search Report of PCT/JP2005/012237, date of mailing Oct. 11, 2005.

(Continued)

*Primary Examiner*—Shean C Wu
(74) *Attorney, Agent, or Firm*—Westerman, Hattori, Daniels & Adrian, LLP.

(57) ABSTRACT

The invention has an object to provide a liquid crystal composite capable of sufficiently reducing the scattering of light in a focal conic state, a liquid crystal display element excellent in improvements of a color balance and a contrast, and electronic paper using the same. The content of a chiral material is higher in a cholesteric liquid crystal LCg for G than in a cholesteric liquid crystal LCb for B, and is higher in a cholesteric liquid crystal LCr for R than in the cholesteric liquid crystal LCg for G. The cholesteric liquid crystal LCr for R is prepared by mixing about 5 wt % of a chiral material CHl1 of an L-form with a base liquid crystal of an R-form, which contains 27 wt % of CHr1 of the R-form exhibiting a liquid crystallizability for a nematic liquid crystal LCn, and 3 wt % of a chiral material CHr2 of the R-form exhibiting no crystallizability.

14 Claims, 11 Drawing Sheets

U.S. PATENT DOCUMENTS

| | | |
|---|---|---|
| 6,338,883 B1 | 1/2002 | Iwamatsu et al. |
| 6,809,788 B2 * | 10/2004 | Yamada et al. .............. 349/129 |
| 6,852,375 B2 * | 2/2005 | Kobayashi et al. ........... 428/1.3 |
| 6,947,117 B2 * | 9/2005 | Anderson et al. ........... 349/193 |
| 2002/0196404 A1 | 12/2002 | Ueda et al. |
| 2003/0183805 A1 | 10/2003 | Kobayashi et al. |

FOREIGN PATENT DOCUMENTS

| | | |
|---|---|---|
| JP | 2004-002765 A | 1/2004 |
| JP | 2004-170868 A | 6/2004 |
| JP | 2005-004179 A | 1/2005 |

OTHER PUBLICATIONS

Extended European Search Report dated Apr. 27, 2009, Application No. 05765296.8 - 2205.

* cited by examiner

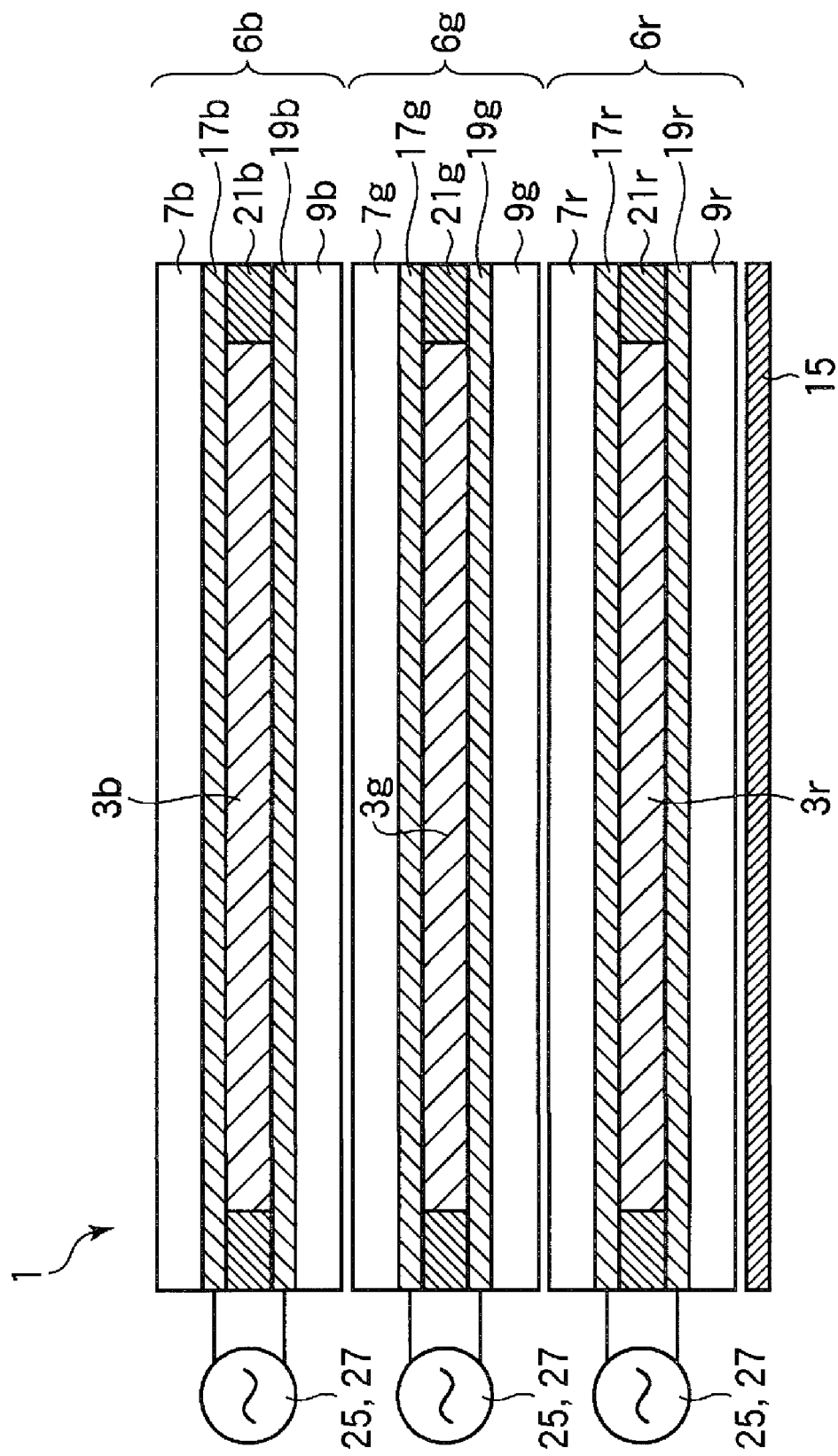

LIQUID CRYSTAL COMPOSITION, LIQUID CRYSTAL DISPLAY ELEMENT USING THE SAME, AND ELECTRONIC PAPER INCLUDING THE SAME

This application is a continuation of International Application No. PCT/JP2005/012237, filed Jul. 1, 2005.

BACKGROUND OF THE INVENTION

1. Field of the Invention

The present invention relates to a liquid crystal composition in which a cholesteric phase is formed, a liquid crystal display element using the same, and electronic paper including the same.

2. Description of the Related Art

Recently, development of electronic paper is active in enterprises, universities, and etc. As markets considered to have promising applications of electronic paper, various applied portable apparatus have been proposed, including electronic books first of all, sub-displays of mobile terminal apparatus, and display parts of IC cards. A promising display method for electronic paper employs a display element utilizing a liquid crystal composition in which a cholesteric phase is formed (a cholesteric liquid crystal). A cholesteric liquid crystal has excellent characteristics such as semi-permanent display holding characteristics (memory characteristics), vivid color display characteristics, high contrast characteristics, and high resolution characteristics.

FIG. 10 schematically shows a sectional configuration of a liquid crystal display element 51 capable of full-color display using cholesteric liquid crystals. The liquid crystal display element 51 has a structure in which a blue (B) display portion 46b, a green (G) display portion 46g, and a red (R) display portion 46r are stacked in the order listed from the side of a display surface. In the figure, the display surface is provided on the side where a top substrate 47b is provided, and outside light (indicated by the arrow in a solid line) impinges on the display surface from above the substrate 47b. An eye of a viewer and the viewing direction (indicated by the arrow in a broken line) are schematically illustrated above the substrate 47b.

The B display portion 46b has a liquid crystal layer 43b for blue (B) enclosed between a pair of top and bottom substrates 47b and 49b and a pulse voltage source 41b for applying a predetermined pulse voltage to the liquid crystal layer 43b for B. The G display portion 46g has a liquid crystal layer 43g for green (G) enclosed between a pair of top and bottom substrates 47g and 49g and a pulse voltage source 41g for applying a predetermined pulse voltage to the liquid crystal layer 43g for G. The R display portion 46r has a liquid crystal layer 43r for red (R) enclosed between a pair of top and bottom substrates 47r and 49r and a pulse voltage source 41r for applying a predetermined pulse voltage to the liquid crystal layer 43r for R. A light absorbing layer 45 is disposed on a bottom surface of the bottom substrate 49r of the display portion 46r for R.

The cholesteric liquid crystals used in the liquid crystal layers 43b, 43g, and 43r for B, G, and R are liquid crystal mixtures obtained by adding a chiral additive (also called a chiral material) in a relatively great amount, i.e., at a content of several tens wt %, to a nematic liquid crystal. When a nematic liquid crystal contains a relatively great amount of chiral material, a cholesteric phase, which is a strong helical twist of a layer of nematic liquid crystal molecules, can be formed. A cholesteric liquid crystal is also referred to as a chiral nematic liquid crystal.

A cholesteric liquid crystal has bistability (memory characteristics), and the liquid crystal can be put in either planar state or focal conic state by adjusting the intensity of an electric field applied to the same. When the liquid crystal once goes to the planar state or the focal conic state, it stays in the state with stability even when there is no electric field. The planar state is obtained by applying a predetermined high voltage between top and bottom substrates 47 and 49 to apply an intense electric field to a liquid crystal layer 43 and abruptly making the electric field zero thereafter. The focal conic state can be obtained, for example, by applying a predetermined voltage lower than the high voltage between the top and bottom substrates 47 and 49 to apply an electric field to the liquid crystal layer 43 and abruptly making the electric field zero thereafter.

The display principle of the liquid crystal display element utilizing cholesteric liquid crystals will now be described with reference to the B display portion 46b by way of example. FIG. 11A shows alignment of liquid crystal molecules 33 of the cholesteric liquid crystal observed when the liquid crystal layer 43b for B of the B display portion 46b is in the planar state. As shown in FIG. 11A, the liquid crystal molecules 33 in the planer state are sequentially rotated in the direction of the thickness of the substrates to form a helical structure, and the helical axis of the helical structure is substantially perpendicular to substrate surfaces.

In the planar state, light rays having predetermined wavelengths in accordance with the helical pitch of the liquid crystal molecules are selectively reflected by the liquid crystal layer. A wavelength $\lambda$ at which the maximum reflection occurs is expressed by $\lambda = n \cdot p$ where n represents the average refractive index of the liquid crystal layer and p represents the helical pitch.

Therefore, when blue light is to be selectively reflected by the liquid crystal layer 43b for B of the B display portion 46b in the planar state, the average refractive index n and the helical pitch p are determined, for example, such that $\lambda = 480$ nm is true. The average refractive index n can be adjusted through selection of the liquid crystal material and the chiral material, and the helical pitch p can be adjusted by adjusting the content of the chiral material.

FIG. 11B shows alignment of the liquid crystal molecules 33 of the cholesteric liquid crystal observed when the liquid crystal layer 43b for B of the B display portion 46b is in the focal conic state. As shown in FIG. 11B, the liquid crystal molecules 33 in the focal conic state are sequentially rotated in in-plane directions of the substrates to form a helical structure, and the helical axis of the helical structure is substantially parallel to the substrate surfaces. In the focal conic state, the liquid crystal layer 43b for B loses the selectivity of wavelengths to reflect, and most of incident rays are transmitted. Since the transmitted rays are absorbed by the light-absorbing layer 45 disposed on the bottom surface of the bottom substrate 49r of the R display portion 46r, a dark (black) state can be displayed.

As thus described, in the case of the cholesteric liquid crystal, the reflection and transmission of light can be controlled by the alignment of the liquid crystal molecules 33 which are helically twisted. The liquid crystal display element 51 capable of full-color display is fabricated by enclosing a cholesteric liquid crystal selectively reflecting green or red light in the planar state in the liquid crystal layer 43g for G and the liquid crystal layer 43r for R, respectively, in the same manner as for the liquid crystal layer 43b for B as described above.

FIG. 12 shows examples of reflection spectra of the liquid crystal layers 43b, 43g, and 43r in the planar state. The abscissa axis represents wavelengths (nm) of reflected light, and the ordinate axis represents reflectance (in comparison to a white plate; %). The spectrum of reflection in the liquid crystal layer 43b for B is indicated by the curve connecting the symbols ▲ in the figure. Similarly, the spectrum of reflection in the liquid crystal layer 43g for G is indicated by the curve connecting the symbols ■, and the spectrum of reflection in the liquid crystal layer 43r for R is indicated by the curve connecting the symbols ♦.

As shown in FIG. 12, the center wavelengths of the reflection spectra of the liquid crystal layers 43b, 43g, and 43r in the planar state have magnitudes in an ascending order of B, G, and R. Therefore, the helical pitches of the cholesteric liquid crystals in the liquid crystal layers 43b, 43g, and 43r have magnitudes ascending in the order in which the layers are listed. Thus, the chiral material contents of the cholesteric liquid crystals in the liquid crystal layers 43b, 43g, and 43r must descend in the order in which the liquid crystal layers are listed.

In general, a greater twist must be given to the liquid crystal molecules to shorten the helical pitch thereof, the shorter the wavelengths to be reflected. Accordingly, the chiral material content of the cholesteric liquid crystal increases. There is another general tendency that an increase in a chiral material content necessitates an increase in a driving voltage. Further, a reflection bandwidth $\Delta\lambda$ increases with refractive index anisotropy $\Delta n$ of a cholesteric liquid crystal.

Patent Document 1: JP-A-2003-147363
Patent Document 2: JP-A-2004-2765

A color liquid crystal display element having an RGB multi-layer structure utilizing cholesteric liquid crystals has a problem in that it is liable to degrading of the balance of color reproduction ranges and reduction in contrast. The balance of color reproduction ranges and contrast is significantly affected by scattering of light in a layer(s) in the dark state or focal conic state. For example, let us assume that any one of the liquid crystal layers is in the planar state and the liquid crystal layers for the remaining two colors are in the focal conic state. Then, when light is significantly scattered in the liquid crystal layers in the focal conic state, components of light scattered in the liquid crystal layers in the focal conic state are added to light reflected by the liquid crystal layer in the planar state as noises. As a result, the color purity of the displayed color is reduced. While all of the RGB liquid crystal layers are in the focal conic state when black is displayed, the density of the black is significantly reduced when light is significantly scattered in the liquid crystal layers. That is, the displayed image has a low contrast, and the display is blurred.

It is considered that a physical property dominating the scattering of light in a liquid crystal layer in the focal conic state is refractive index anisotropy $\Delta n$ specific to the liquid crystal material. FIGS. 13A and 13B show relationships between refractive index anisotropy $\Delta n$ and reflection of light in a liquid crystal layer. FIG. 13A shows a relationship between the refractive index anisotropy $\Delta n$ and the brightness of reflected light in the planer state. The abscissa axis represents the refractive index anisotropy $\Delta n$, and the ordinate axis represents brightness (in comparison to a white plate; %). FIG. 13B shows a relationship between the refractive index anisotropy $\Delta n$ and scattering of light in the focal conic state. The abscissa axis represents the refractive index anisotropy $\Delta n$, and the ordinate axis represents scattering (in comparison to a white plate; %).

As shown in FIGS. 13A and 13B, the liquid crystal layer has a higher refractive index in the planar state, the greater the $\Delta n$ value. Although the brightness of the display screen of the liquid crystal display element is therefore improved, the scattering of light in the liquid crystal layer in the focal conic state is worsened at the same time. On the contrary, the scattering of light in the liquid crystal layer in the focal conic state is reduced at a smaller $\Delta n$ value. However, since the refractive index of the liquid crystal layer in the planar state is also reduced, the brightness of the display screen is reduced. Thus, the relationship between the brightness and scattering of reflected light is a trade-off, and it is therefore difficult to achieve high brightness of the display screen and low scattering at the same time only by controlling the $\Delta n$ value.

Patent Document 1 discloses a technique for providing cholesteric liquid crystals of liquid crystal layers for R, G, and B by mixing R and S materials, which are two optical isomers of chiral materials having different optical rotations, at different mixing ratios such that the same amount of the chiral materials is added in the liquid crystal layers for R, G, and B. However, even when the same amount of chiral materials is added in the liquid crystal layers for R, G, and B to provide the layers with the same physical properties such as $\Delta n$, the liquid crystal layers have different light scattering characteristics. It is therefore difficult to improve the color balance and contrast of the display screen satisfactorily.

SUMMARY OF THE INVENTION

According to one aspect in the invention, a liquid crystal display element comprises a first liquid crystal layer having a first chiral material contained in a nematic liquid crystal to form a cholesteric phase such that light having a first wavelength is reflected in a planar state and a second liquid crystal layer having a second chiral material contained in a nematic liquid crystal at a content higher than the content of the first chiral material to form a cholesteric phase such that light having a second wavelength longer than the first wavelength is reflected in the planar state.

According to another aspect in the invention, an electronic paper includes a display portion for displaying a predetermined image, wherein the display portion has a liquid crystal display element according to the invention as described above.

According to another aspect in the invention, a liquid crystal composition includes a nematic liquid crystal and a chiral material contained in the nematic liquid crystal to form a cholesteric phase, wherein the chiral material has a content higher than a content at which light having a first wavelength is reflected such that light having a second wavelength longer than the first wavelength is reflected in the planar state.

According to another aspect in the invention, a liquid crystal composition includes the chiral material has refractive index anisotropy smaller than that of the nematic liquid crystal.

BRIEF DESCRIPTION OF THE DRAWINGS

FIG. 4 is an illustration schematically showing a sectional configuration of the liquid crystal display element 1 in the mode for carrying out the invention;

DESCRIPTION OF THE PREFERRED EMBODIMENTS

A description will now be made with reference to FIGS. 1A to 9 on a liquid crystal composition, a liquid crystal display element using the same, and electronic paper using the same in a mode for carrying out the invention. First, a description will be made with reference to FIGS. 1A to 3 on a basic principle behind the reduction of light scattering in the dark state and a liquid crystal composition adopting the principle. The inventors have found that a liquid crystal layer for blue (B) reflecting blue light, a liquid crystal layer for green (G) reflecting green light, and a liquid crystal layer for red (R) reflecting red light in the planar state suffer from scattering of light in the focal conic state at degrees of severity ascending in the order in which the layers are listed and that light is severely scattered especially in the liquid crystal layer for R to cause a significant reduction in the color purity of blue and green. The inventors made close studies on mitigation of the problem.

Figure 1A:
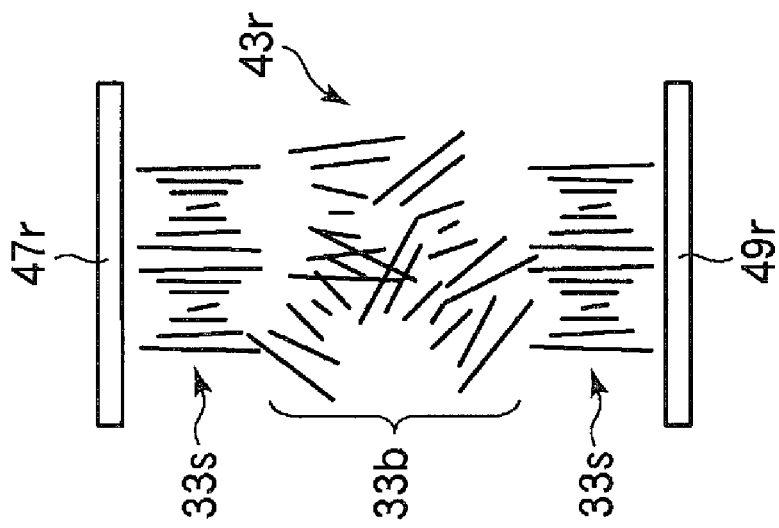
FIGS. 1A to 1C are illustrations schematically showing states of liquid crystal molecules in liquid crystal layers for B, G, and R according to the related art in the focal conic state.
Figure 1B:
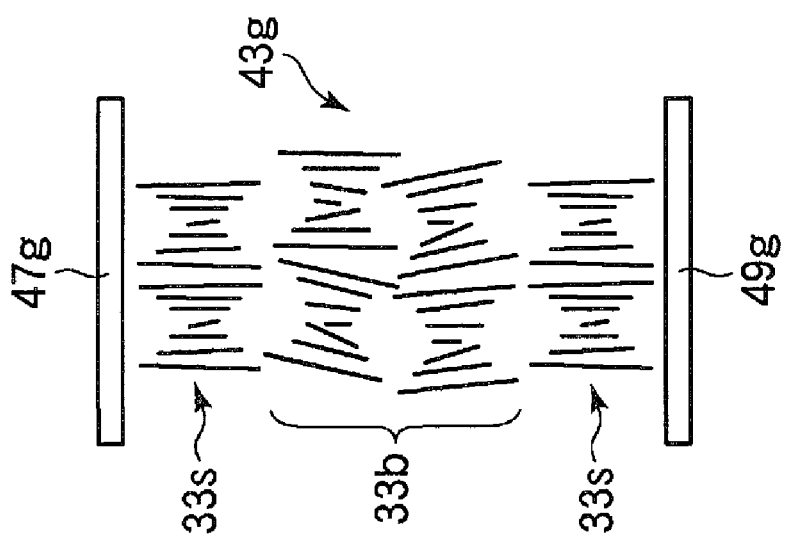
Figure 1C:
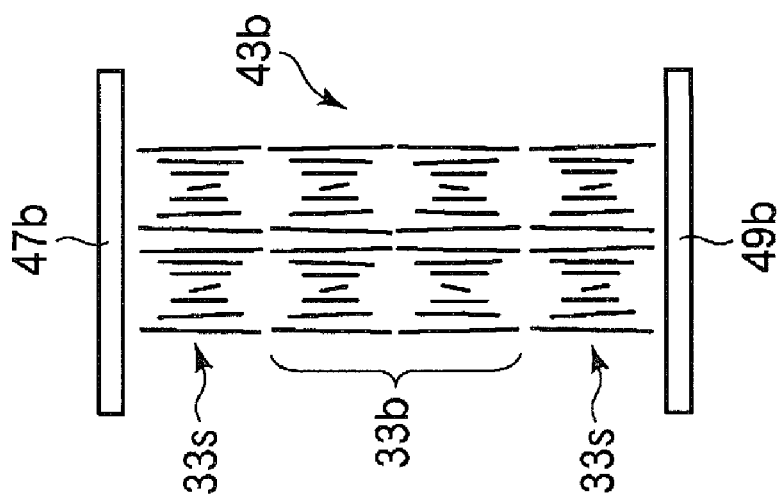
Figure 10:
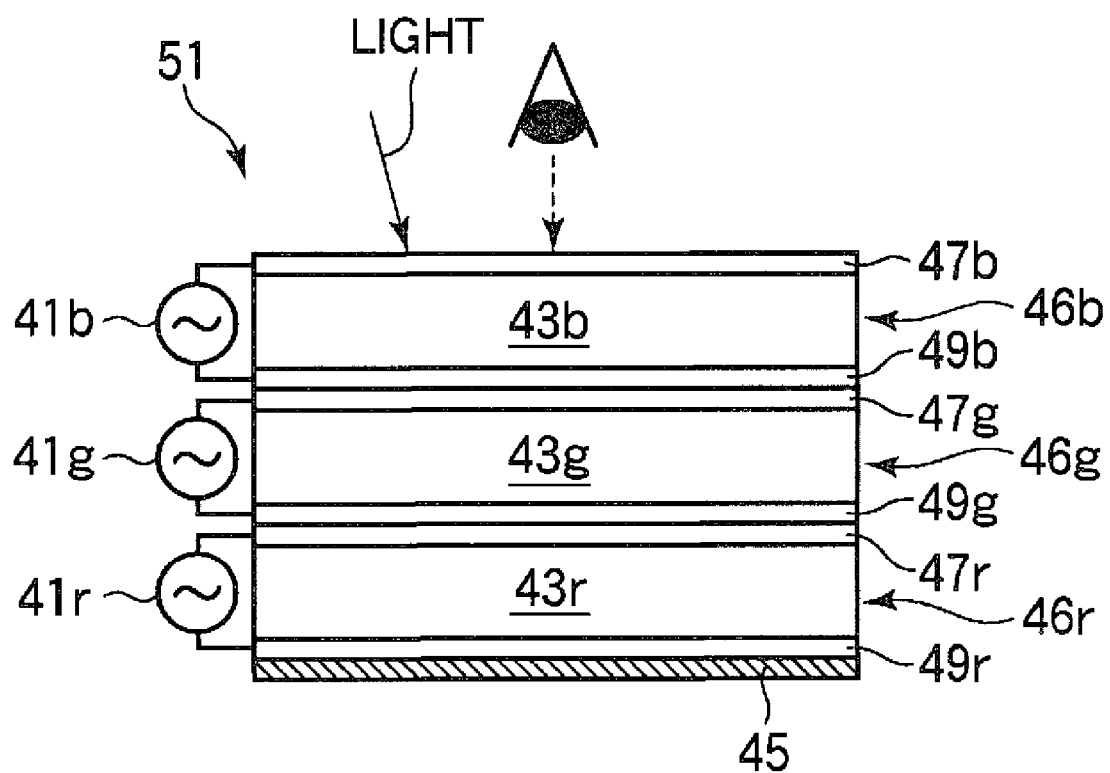
FIG. 10 is an illustration schematically showing a sectional configuration of a liquid crystal display element capable of full-color display according to the related art.
Figure 11A:
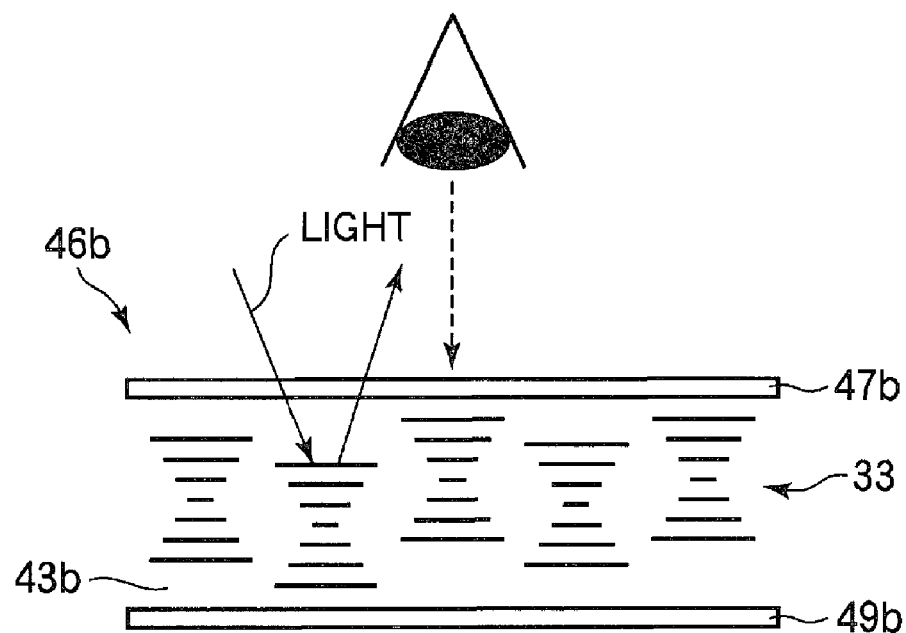
FIGS. 11A and 11B are illustrations schematically showing a sectional configuration of one liquid crystal layer of the liquid crystal display element according to the related art.
Figure 11B:
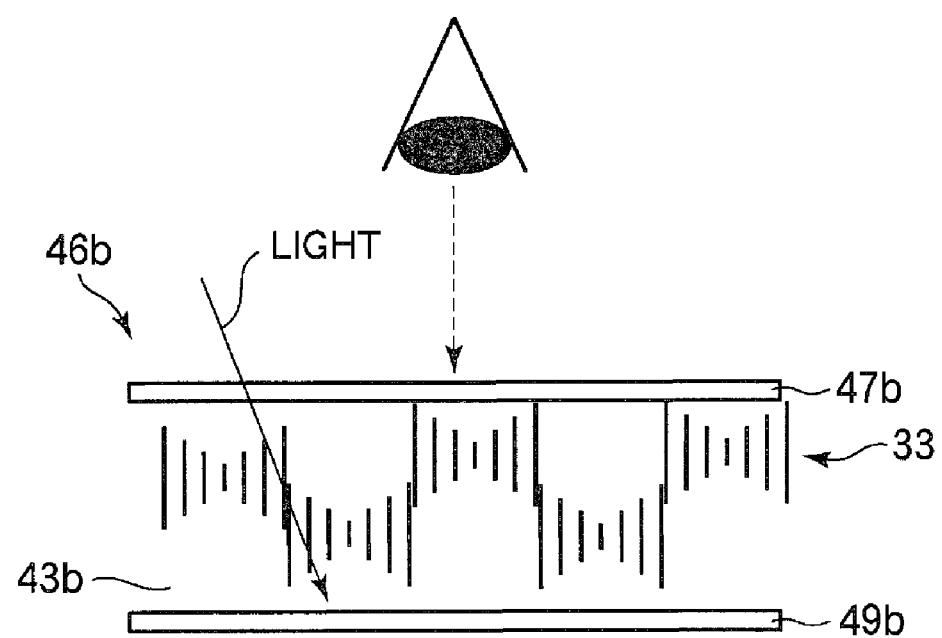

First, the cause of the relatively severe scattering of light in the liquid crystal layer for R will be described using FIGS. 1A to 1C. FIGS. 1A, 1B and 1C show alignment of the liquid crystal molecules 33 of the cholesteric liquid crystals in the liquid crystal layers 43b, 43g, and 43r for B, G, and R of the color liquid crystal display element 51 according to the related art shown in FIGS. 10 to 11B in the focal conic state, respectively. FIG. 1A shows the liquid crystal layer 43b for B; FIG. 1B shows the liquid crystal layer 43g for G; and FIG. 1C shows the liquid crystal layer 43r for R.

The content of the chiral material in the cholesteric liquid crystal (a mixture of a nematic liquid crystal and a chiral material) of the liquid crystal layer 43b for B according to the related art (=100×(the weight of the chiral material contained)/(the weight of the cholesteric liquid crystal)) is 30% by weight (wt). The content of the chiral material in the liquid crystal layer 43g for G is 27 wt %; and the content of the chiral material in the liquid crystal layer 43r for R is 23 wt %.

In any of FIGS. 1A, 1B and 1C, liquid crystal molecules 33 in the neighborhood of substrate surfaces of the top and bottom substrates 47 and 49 are sequentially rotated in in-plane directions of the substrates to form a helical structure, and the helical axis of the helical structure is maintained in the focal conic state in which the axis is substantially in parallel with the substrate surfaces. This is considered attributable to the fact that a strong alignment regulating force from the substrates acts on liquid crystal molecules at interfaces between the liquid crystal and the substrates.

On the contrary, in a part of the cell in the middle of the same when viewed in the thickness direction thereof (a bulk region), the alignment regulating force of the substrate surfaces does not directly act on liquid crystal molecules 33b, and the propagation of alignment attributable to the continuity of the liquid crystal is dominant. In this case, while the alignment regulating force can be propagated even in the bulk region when the content of the chiral material is relatively high, a sufficient aligning force cannot be propagated in the bulk region when the content is low.

For this reason, in the liquid crystal layer 43b for B having a high chiral material content, a sufficient focal conic state appears substantially uniformly in the thickness direction of the cell. In the liquid crystal layer 43g for G and the liquid crystal layer 43r for R having a relatively low chiral material content, a state of alignment different from the focal conic state can appear in the bulk region. In the case of the liquid crystal layer 43g for G, the result is only increased variation in the helical axis direction of the liquid crystal in the bulk region. In the case of the liquid crystal layer 43r for R, however, it is assumed that variation increases not only in the direction of the helical axis but also in the helical structure including the helical pitch. Thus, a bulk region has a more significant alignment defect in the focal conic state, the smaller the content of the chiral material. It is assumed that the degree of scattering of light will increase accordingly.

The above description has outlined a possible cause of relatively severe scattering of light that occurs in the liquid crystal layer for R.

A review of the above-described cause of the problem from a different point of view suggests that a chiral material contained in a nematic liquid crystal to form a cholesteric phase provides the effect of suppressing variation in a helical structure of liquid crystal molecules.

Therefore, the present mode for carrying out the invention is based on a fundamental principle that the content of a chiral material in a liquid crystal composition reflecting light having a second wavelength longer than a first wavelength in the planar state is rendered higher than the content of a chiral material in a liquid crystal composition reflecting light having the first wavelength in the planar state and that the chiral materials include two types of optical isomers having different optical rotations. In this description, those optical isomers will be hereinafter described using designations "R-form" and "L-form" which have the same meanings as "R-form" and "S-form" in the case of the R/S display method.

A liquid crystal composition (cholesteric liquid crystal) adopting the above-described fundamental principle for reducing scattering of light in the dark state is produced from a base (reference) liquid crystal as a basic composition, which is an R-form or an L-form that is an optical isomer of the R-form.

The base liquid crystal that is an R-form is produced by adding an R-form chiral material CHr1 and an R-form chiral material CHr2 having predetermined weights to a nematic liquid crystal LCn having a predetermined weight. The content of the chiral material CHr1 (the content is represented by the ratio by weight (wt %) of the chiral material CHr1 to the total weight of the nematic liquid crystal LCn and the chiral materials CHr1 and CHr2, which applies to the following description) is 27 wt %. The content of the chiral material CHr2 is 3 wt %. Hereinafter, the chiral material CHr1 and the chiral material CHr2 thus contained may be collectively referred to as "chiral material CHr".

For example, the nematic liquid crystal LCn has refractive index anisotropy $\Delta n=0.25$ and dielectric constant anisotropy $\Delta \epsilon=20$, and viscosity $\mu=50(mPa \cdot s)$ at room temperature. For example, the chiral material CHr1 has $\Delta n=0.22$, $\Delta \epsilon=22$, and helical twisting power HTP=10. The chiral material CHr2 has the same $\Delta n$ and $\Delta \epsilon$ values as those of the chiral material CHr1 and has HTP=20. A base liquid crystal, which is an R-form, thus fabricated causes selective reflection at a main wavelength $\lambda b$ of about 480 nm and $\Delta n=0.23$.

For example, the physical properties of the nematic liquid crystal LCn are measured or calculated as follows. First, the nematic liquid crystal LCn is injected into a testing cell made of glass. Then, the specific resistance and the dielectric constant of the nematic liquid crystal LCn are measured and calculated using an LCR meter that is sold on the market. Viscosity is measured using a viscometer that is sold on the market.

Further, $\Delta n$ of the nematic liquid crystal LCn is measured using an Abbe refractometer or the like that is sold on the market. The electrostatic capacitance of each of testing cells in which the liquid crystal is horizontally and vertically aligned is measured to calculate $\Delta \epsilon$ of the nematic liquid crystal LCn. $\Delta \epsilon$ represents a difference between a dielectric constant in the direction of the director (an average direction of longer axes of liquid crystal molecules) and a dielectric constant of components in a direction perpendicular to the director.

A base liquid crystal that is an L-form is produced by adding an L-form chiral material CHl1 and an L-form chiral material CRl2 having predetermined weights to a nematic liquid crystal LCn having a predetermined weight. The content of the chiral material CHl1 (the content is represented by the ratio by weight (wt %) of the chiral material CHl1 to the total weight of the nematic liquid crystal LCn and the chiral materials CHl1 and CHl2, which applies to the following description) is 27 wt %. The content of the chiral material CHl2 is 3 wt %. Hereinafter, the chiral material CHl1 and the chiral material CHl2 thus contained may be collectively referred to as "chiral material CHl".

The $\Delta n$ value, $\Delta \epsilon$ value, and viscosity $\mu$ of the nematic liquid crystal LCn of the base liquid crystal, which is an L-form, are the same as those of the above-described base liquid crystal which is an R-form. The $\Delta n$ value, $\Delta \epsilon$ value, and HTP value of the chiral material CHl1 are the same as those of the above-described R-form chiral material CHr1. The $\Delta n$ value, $\Delta \epsilon$ value, and HTP value of the chiral material CHl2 are the same as those of the above-described R-form chiral material CHr2. The base liquid crystal, which is an L-form, thus fabricated has $\lambda b$ and $\Delta n$ which are the same as those of the above-described base liquid crystal which is an R-form.

Ordinary materials sold on the market are used as the nematic liquid crystal LCn and the chiral materials CHr1, CHr2, CHl1, and CHl2.

Figure 2A:
FIGS. 2A to 2C are illustrations showing composition ratios of materials included in liquid crystal compositions in a mode for carrying out the invention.
Figure 2B:
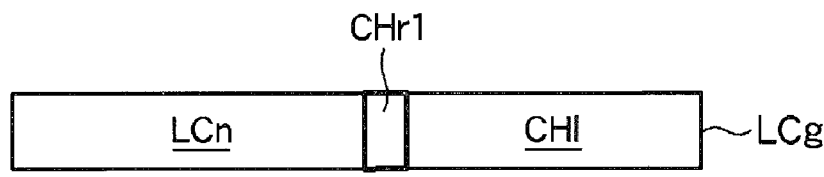
Figure 2C:
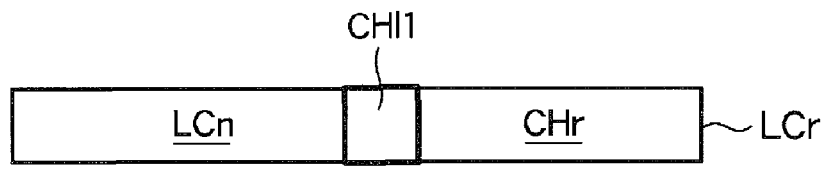

FIGS. 2A to 2C show composition ratios of the materials of liquid crystal compositions using the above-described base liquid crystal, which is an R or L-form, as a base composition. FIG. 2A shows composition ratios of a cholesteric liquid crystal used in a liquid crystal layer (a first liquid crystal layer) for B reflecting blue light (light having a first wavelength) in the planar state. FIG. 2B shows composition ratios of a cholesteric liquid crystal used in a liquid crystal layer (a second liquid crystal layer) for G reflecting green light (light having a second wavelength). FIG. 2C shows composition ratios of a cholesteric liquid crystal used in a liquid crystal layer (a third liquid crystal layer) for R reflecting red light (light having a third wavelength).

As shown in FIG. 2A, a base liquid crystal that is an R-form (hereinafter referred to as a cholesteric liquid crystal LCb for B) is used in the liquid crystal layer for B. That is, the cholesteric liquid crystal LCb for B selectively reflects a main wavelength $\lambda b$ of about 480 nm and has $\Delta n=0.23$.

As shown in FIG. 2B, a liquid crystal obtained by mixing the R-form chiral material CHr1 in a base liquid crystal, which is an L-form, to a content of about 3 wt % (hereinafter referred to as cholesteric liquid crystal LCg for G) is used in the liquid crystal layer for G. The cholesteric liquid crystal LCg for G causes selective reflection at a main wavelength $\lambda g$ of about 560 nm and has substantially the same $\Delta n$ value as that of the cholesteric liquid crystal for B.

As shown in FIG. 2C, a liquid crystal obtained by mixing the L-form chiral material CHl1 in a base liquid crystal, which is an R-form, to a content of about 5 wt % (hereinafter referred to as cholesteric liquid crystal LCr for R) is used in the liquid crystal layer for R. The cholesteric liquid crystal LCr for R causes selective reflection at a main wavelength $\lambda r$ of about 610 nm and has substantially the same $\Delta n$ value as that of the cholesteric liquid crystal for B.

As thus described, in the present mode for carrying out the invention, the choresteric liquid crystals LCb and LCr for B and R provide the same optical rotation (R) which is different from optical rotation (L) in the cholesteric liquid crystal LCg for G. The content of the chiral material of the choresteric liquid crystal LCg for G is higher than that of the cholesteric liquid crystal LCb for B, and the content of the chiral material of the cholesteric liquid crystal LCr for R is higher than that of the cholesteric liquid crystal LCg for G. Cholesteric phases are formed in the cholesteric liquid crystals LCb, LCg, and LCr for B, G, and R at room temperature.

Figure 3:
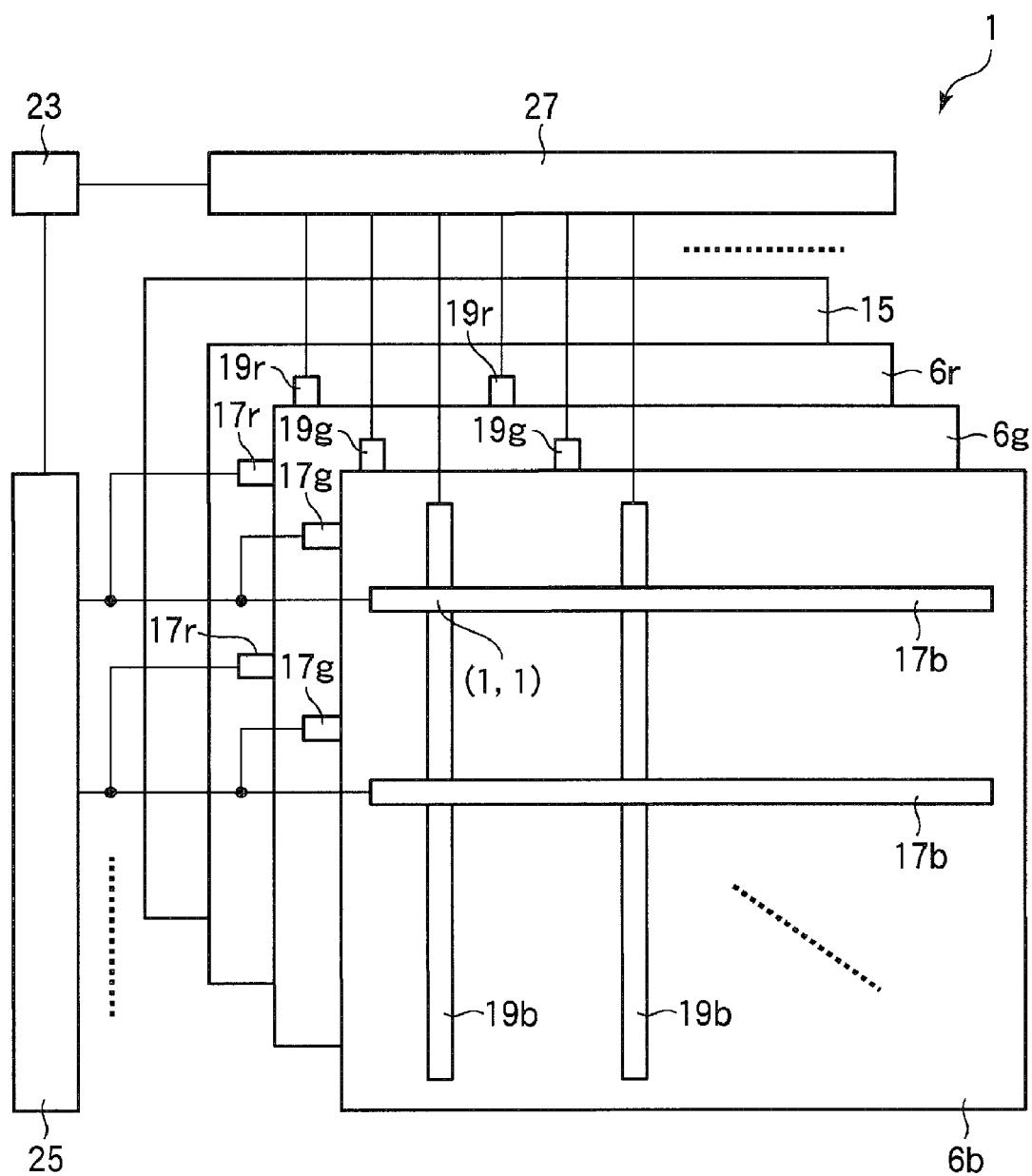
FIG. 3 is a diagram showing a schematic configuration of a liquid crystal display element 1 in the mode for carrying out the invention.

A description will now be made with reference to FIGS. 3 to 6 on a liquid crystal display element and electronic paper using cholesteric liquid crystals LCb, LCg, and LCr for B, G, and R as described above. FIG. 3 shows a schematic configuration of a liquid crystal display element 1 in the present mode for carrying out the invention. FIG. 4 schematically shows a sectional configuration of the liquid crystal display element 1.

As shown in FIGS. 3 and 4, the liquid crystal display element 1 includes a B display portion 6b having a liquid crystal layer 3b for B (a first liquid crystal layer) reflecting blue light (light having a first wavelength) in the planar state, a G display portion 6g having a liquid crystal layer 3g for G (a second liquid crystal layer) reflecting green light (light having a second wavelength) in the planar state, and an R display portion 6r having a liquid crystal layer 3r for R (a third liquid crystal layer) reflecting red light (light having a third wavelength) in the planar state. The display portions 6b, 6g, and 6r for B, G, and R are formed in the order listed starting from the side of a light entrance surface (display surface).

The B display portion 6b includes a pair of top and bottom substrates 7b and 9b disposed opposite to each other and the liquid crystal layer 3b for B enclosed between the two substrates 7b and 9b. The liquid crystal layer 3b for B includes a cholesteric liquid crystal LCb for B having the composition shown in FIG. 2A.

The G display portion 6g includes a pair of top and bottom substrates 7g and 9g disposed opposite to each other and the liquid crystal layer 3g for G enclosed between the two substrates 7g and 9g. The liquid crystal layer 3g for G includes a cholesteric liquid crystal LCg for G having the composition shown in FIG. 2B.

The R display portion 6r includes a pair of top and bottom substrates 7r and 9r disposed opposite to each other and the liquid crystal layer 3r for R enclosed between the two substrates 7r and 9r. The liquid crystal layer 3r for R includes a cholesteric liquid crystal LCr for R having the composition shown in FIG. 2C.

Figure 12:
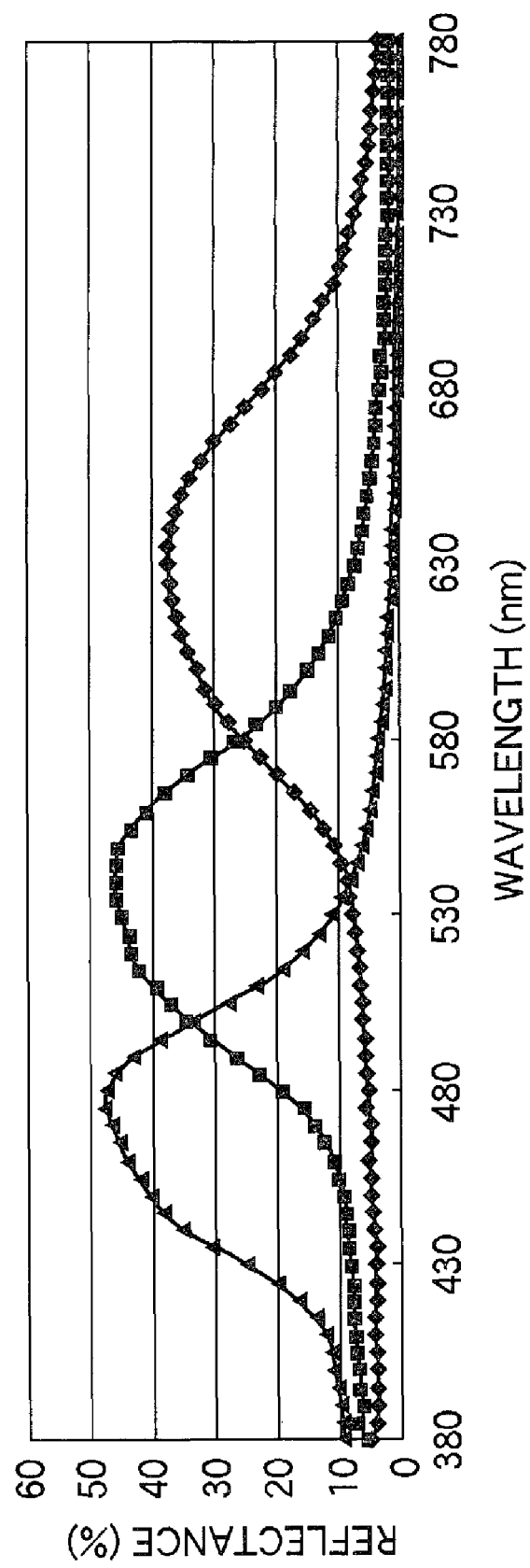
FIG. 12 is a graph showing examples of reflection spectra of the liquid crystal display element according to the related art in a planar state.
Figure 13A:
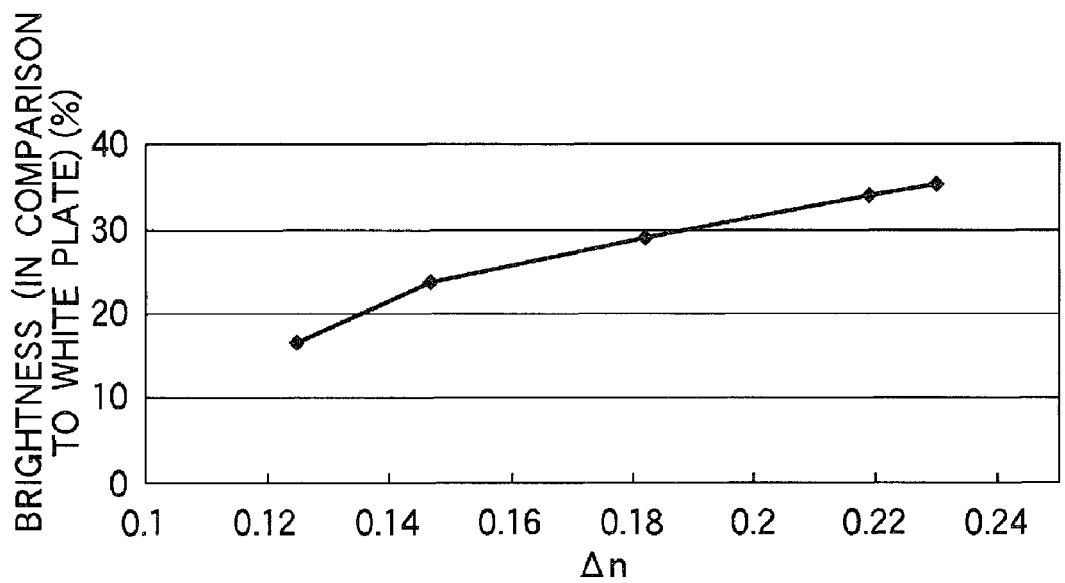
FIGS. 13A and 13B are graphs showing a relationship between the refractive index anisotropy Δn of the liquid crystal display element according to the related art and reflection of light in a liquid crystal layer.
Figure 13B:
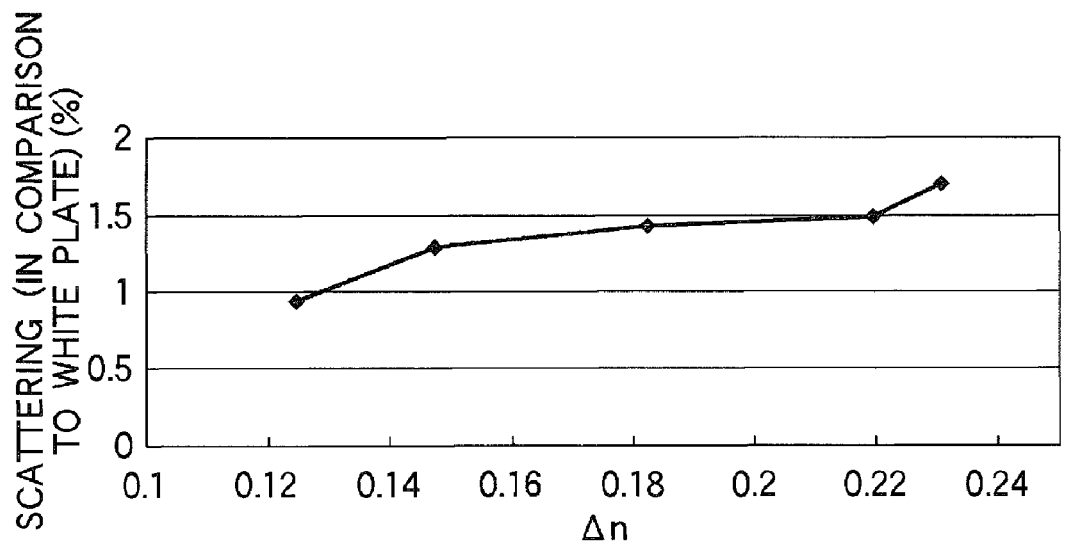

In the multi-layer structure formed by the display portions 6b, 6g, and 6r for B, G, and R, optical rotation in the liquid crystal layer 3g for G is different from optical rotation in the liquid crystal layers 3b and 3r for B and R in the planar state. Therefore, in the regions where the blue and green reflection spectra and green and red reflection spectra overlap each other shown in FIG. 12, right circularly polarized light can be reflected by the liquid crystal layer 3b for B, and left circularly polarized light can be reflected by the liquid crystal layer 3g for G. As a result, loss of reflected light can be reduced to improve the brightness of the display screen of the liquid crystal display element 1.

The top substrates 7b, 7g, and 7r and the bottom substrates 9b, 9g, and 9r must be translucent. In the present mode for carrying out the invention, two polycarbonate (PC) film substrates cut to have longitudinal and transversal lengths of 10 (cm)×8(cm) are used. Glass substrates or film substrates made of polyethyleneterephthalate (PET) may be used instead of PC substrates. Although the top substrates 7b, 7g, and 7r and the bottom substrates 9b, 9g, and 9r are all translucent in the present mode for carrying out the invention, the bottom substrate 9r of the R display portion 6r disposed to constitute the lowermost layer may be opaque.

A plurality of data electrodes 19b in the form of stripes are formed in parallel on the side of the bottom substrate 9b of the B display portion 6b facing the liquid crystal layer 3b, the electrodes extending in the vertical direction of FIG. 3. A plurality of scanning electrodes 17b in the form of stripes are formed in parallel on the side of the top substrate 9b of the B display portion 6b facing the liquid crystal layer 3b for B, the electrodes extending in the horizontal direction of FIG. 3. In the present mode for carrying out the invention, ITO transparent electrodes are patterned to form a plurality of scanning electrodes 17 and a plurality of data electrodes 19 in the form of stripes having a pitch of 0.24 mm to allow QVGA display of 320×240 dots.

As shown in FIG. 3, the electrodes 17b and 19b are disposed opposite to each other in an intersecting relationship when viewed in the normal direction of the surfaces of the top and bottom substrates 7b and 9b where the electrodes are formed. Each of the intersections between the electrodes 17b and 19b constitutes a pixel (picture element). The pixels are arranged in the form of a matrix to form a display screen. The reference numerals 17b and 19b shown in FIG. 4 indicate the regions where the electrodes 17b and 19b are provided and do not represent the shapes of them.

For example, an indium tin oxide (ITO) is a typical material from which the electrodes 17b and 19b are formed. Alternative materials that can be used include transparent conductive films made of an indium zinc oxide (IZO) or the like, metal electrodes made of aluminum, silicon or the like, and photoconductive films made of amorphous silicon, bismuth silicon oxide (BSO) or the like.

Preferably, each of the electrodes 17b and 19b is coated with an insulating thin film or a film for stabilizing the alignment of liquid crystal molecules (neither of the films is shown) as a functional film. The insulating thin film prevents shorting between the electrodes 17b and 19b, and it may serve as a gas barrier layer having the function of improving the reliability of the liquid crystal display element 1. Materials usable as the alignment stabilizing films include organic films made of polyimide resins, polyamideimide resins, polyetherimide resins, polyvinylbutylal resins, acryl resins and the like and inorganic materials such as silicon oxides and aluminum oxides. In the present embodiment, for example, alignment stabilizing films are applied (coated) throughout the substrates over the electrodes 17b and 19b. The alignment stabilizing films may also serve as the insulating thin films.

The liquid crystal layer 3b for B is enclosed between the substrates 7b and 9b by a seal material 21b applied to the peripheries of the top and bottom substrates 7b and 9b. The thickness (cell gap) of the liquid crystal layer 3b for B must be kept uniform. In order to maintain a predetermined cell gap, spherical spacers made of a resin or inorganic oxide are dispersed in the liquid crystal layer 3b for B. Alternatively, a plurality of pillar spacers coated with a thermoplastic resin on the surface thereof are formed in the liquid crystal layer 3b for B. In the liquid crystal display element 1 in the present mode for carrying out the invention, spacers (not shown) are inserted in the liquid crystal layer 3b for B to keep the cell gap uniform. Preferably, the liquid crystal layer 3b for B has a cell gap d in the range of 3 $\mu m \leq d \leq 6$ $\mu m$.

The structure of the G display portion 6g and the R display portion 6r will not be described because it is similar to that of the B display portion 6b. A visible light absorbing layer 15 is provided on the outer surface (bottom surface) of the bottom substrate 9r of the R display portion 6r. Therefore, when all of the liquid crystal layers 3b, 3g, and 3r for B, G, and R are in the focal conic state, black is displayed on the display screen of the liquid crystal display element 1. The visible light absorbing layer 15 may be provided as occasion demands.

A scanning electrode driving circuit 25 mounting scanning electrode driver ICs for driving the plurality of scanning electrodes 17b, 17g, and 17r is connected to the top substrates 7b, 7g, and 7r. A data electrode driving circuit 27 mounting data electrode driver ICs for driving the plurality of data electrodes 19b, 19g, and 19r is connected to the bottom substrates 9b, 9g, and 9r. The driving circuits 25 and 27 output scan signals and data signals to predetermined scanning electrodes 17b, 17g, and 17r or data electrodes 19b, 19g, and 19r based on predetermined signals output from a control circuit 23.

In the present mode for carrying out the invention, since the liquid crystal layers 3b, 3g, and 3r for B, G, and R can be driven by substantially the same voltage, a predetermined output terminal of the scanning electrode driving circuit 25 is commonly connected to a predetermined input terminal of each of the scanning electrodes 17b, 17g, and 17r. Since there is no need for providing the scanning electrode driving circuit 25 for each of the display portions 6b, 6g, and 6r for B, G, and R, the configuration of the driving circuit of the liquid crystal display element 1 can be made simple.

Figure 5A:
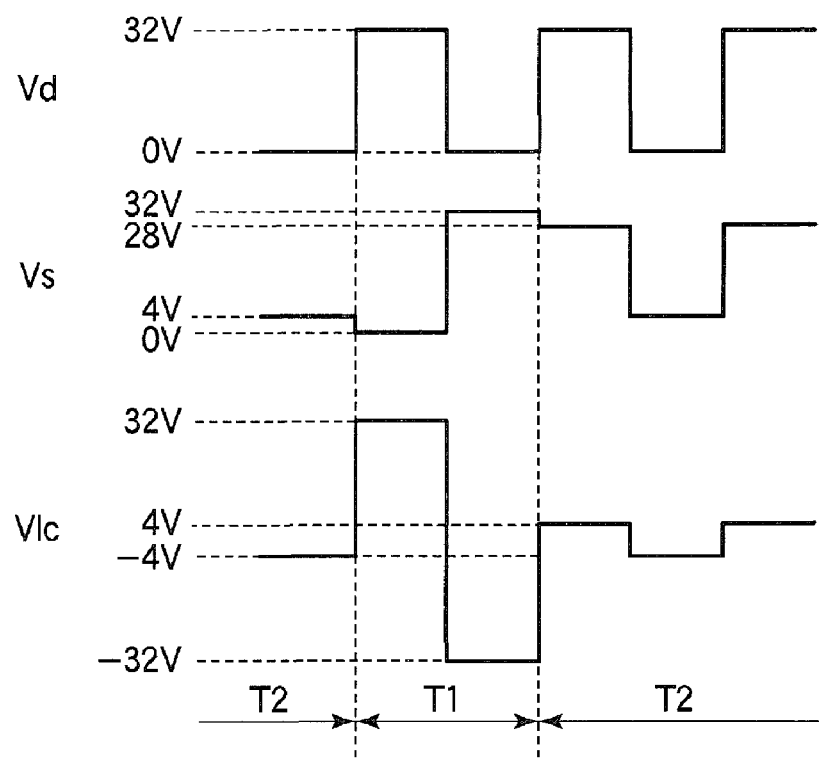
FIGS. 5A and 5B are diagrams showing examples of driving waveforms for the liquid crystal display element 1 in the mode for carrying out the invention.
Figure 5B:
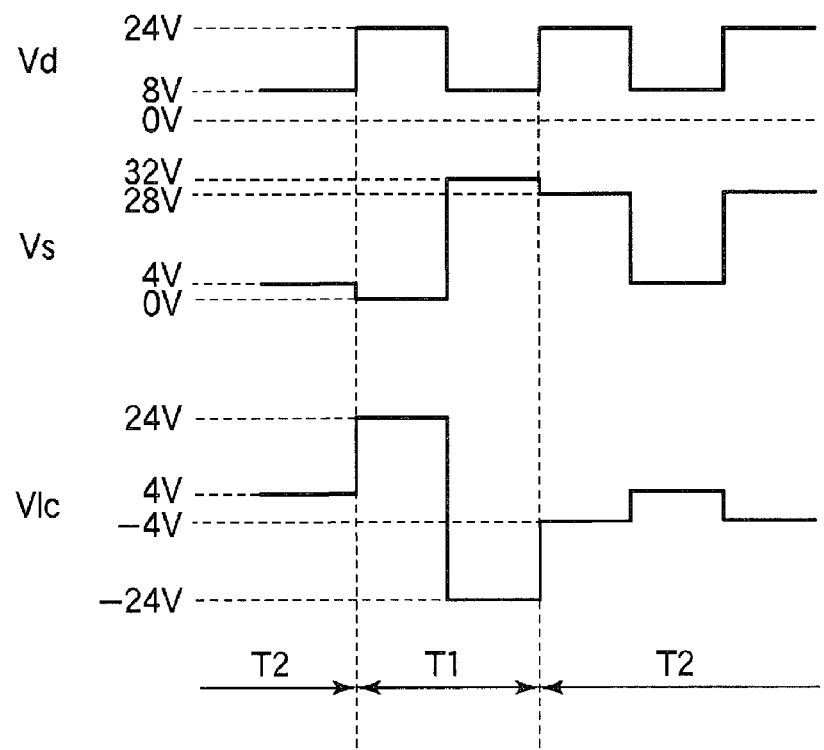

A method of driving the liquid crystal display element 1 will now be described using FIGS. 5A to 6. FIGS. 5A and 5B show examples of driving waveforms of the liquid crystal display element 1. FIG. 5A shows a driving waveform for putting the cholesteric liquid crystals in the planar state, and FIG. 5B shows a driving waveform for putting the cholesteric liquid crystals in the focal conic state. In FIGS. 5A and 5B, a data signal voltage waveform Vd output from the data electrode driving circuit 27 is shown in the top part; a scanning signal voltage waveform Vs output from the scanning electrode driving circuit 25 is shown in the middle part; and an applied voltage waveform Vlc applied to any pixel of the liquid crystal layers 3*b*, 3*g*, and 3*r* for B, G, and R is shown in the bottom part. In FIGS. 5A and 5B, time is shown to lapse in the left-to-right direction in the figures, and voltages are represented in the vertical direction of the figures.

Figure 6:
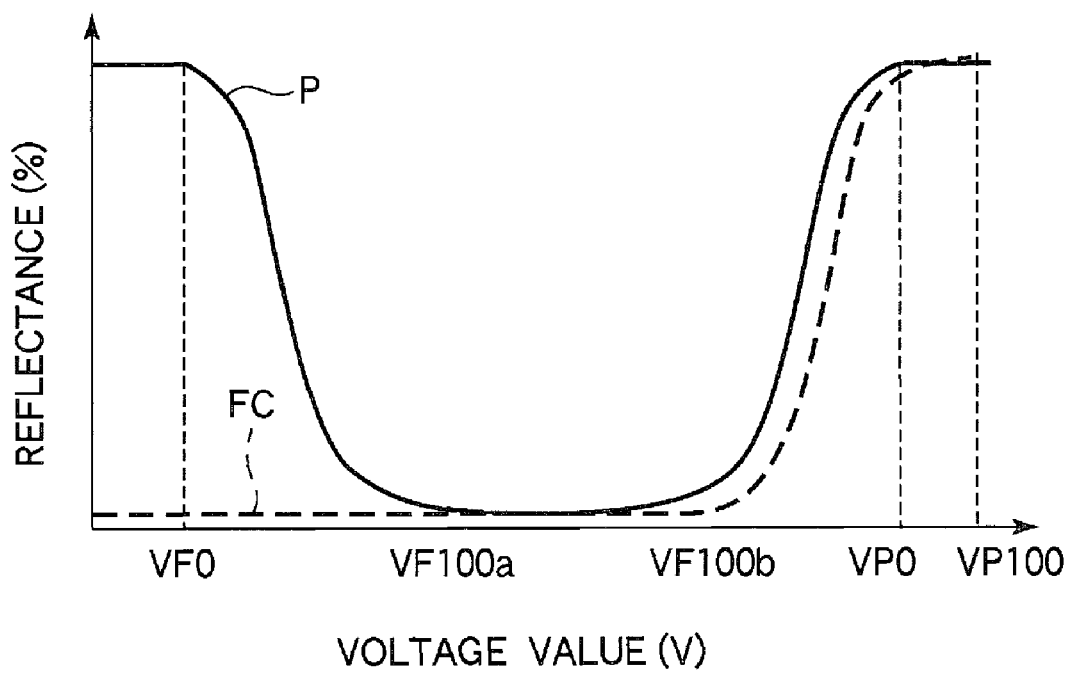
FIG. 6 is a graph showing an example of voltage-reflectance characteristics of a liquid crystal composition in the mode for carrying out the invention.

FIG. 6 shows an example of voltage-reflectance characteristics of a cholesteric liquid crystal. The abscissa axis represents voltages (V) applied to the cholesteric liquid crystal, and the ordinate axis represents reflectance (%) of the cholesteric liquid crystal. The curve P in a solid line shown in FIG. 6 represents voltage-reflectance characteristics of the cholesteric liquid crystal obtained when the initial state is the planar state. The curve FC in a broken line represents voltage-reflectance characteristics of the cholesteric liquid crystal obtained when the initial state is the focal conic state.

An example will now be described, in which a predetermined voltage is applied to a blue (B) pixel (1, 1) that is located at the intersection between the data electrode 19*b* in the first column of the B display portion 6*b* for B shown in FIG. 3 and the scanning electrode 17*b* in the first row. As shown in FIG. 5A, in the first half or about one half of a selection period T1 during which the scanning electrode 17*b* in the first row is selected, the data signal voltage Vd is +32 V, whereas the scanning signal voltage Vs is 0 V. In the second half occupying about one half of the period, the data signal voltage Vd is 0 V, whereas the scanning signal voltage Vs is +32V. Therefore, a pulse voltage of ±32 V is applied to the liquid crystal layer 3*b* for B at the B pixel (1, 1) during the selection period T1. As shown in FIG. 6, when a predetermined high voltage VP100 (e.g., 32 V) is applied to a cholesteric liquid crystal to generate a strong electric field, the helical structure of liquid crystal molecules is completely decomposed into a homeotropic state in which all liquid crystal molecules follow the direction of the electric field. Therefore, the liquid crystal molecules in the liquid crystal layer 3*b* for B at the B pixel (1, 1) are in the homeotropic state during the selection period T1.

When the selection period T1 ends and a non-selection period T2 starts, voltages of, for sample, +28 V and +4 V are applied to the scanning electrode 17*b* in the first row on a cycle which is one half of the selection period T1. On the other hand, predetermined data signal voltages Vd are applied to the data electrode 19*b* in the first column. In FIG. 5A, voltages of, for sample, +32 V and 0 V are applied to the data electrode 17*b* in the first column on a cycle which is one half of the selection period T1. Therefore, a pulse voltage ±4 V is applied to the liquid crystal layer 3*b* for B at the B pixel (1, 1) during the non-selection period T2. As a result, the electric field generated in the liquid crystal layer 3*b* for B at the B pixel (1, 1) during the non-selection period T2 is made substantially zero.

When the voltage applied to the liquid crystal changes from VP100 (±32 V) to VFO (±4 V) to make the electric field substantially zero abruptly with the liquid crystal molecules in the homeotropic state, the liquid crystal molecules enter a helical state in which the helical axis is in a direction substantially perpendicular to the electrodes 17*b* and 19*b*. Thus, a planar state is entered, in which light is selectively reflected according to the helical pitch. Since the liquid crystal layer 3*b* for B at the B pixel (1, 1) thus enters the planar state to reflect light, blue is displayed at the B pixel (1, 1).

As shown in FIG. 5B, in the first half or about one half of the selection period T1 and in the second half occupying about one half of the period, the data signal voltage Vd is at 24V/8V, whereas the scanning signal voltage Vs is at 0 V/+32V. Then, a pulse voltage of ±24 V is applied to the liquid crystal layer 3*b* for B at the B pixel (1, 1). As shown in FIG. 6, when a predetermined low voltage VF100*b* (e.g., 24 V) is applied to the cholesteric liquid crystal to generate a weak electric field, the helical structure of the liquid crystal molecules is not completely decomposed. In the non-selection time T2, for example, voltages of +28 V/+4 V are applied to the scanning electrode 17*b* in the first row on a cycle which is one half of the selection period T1, and predetermined data signal voltages Vd (e.g., +24V/8 V) are applied to the data electrode 19*b* on a cycle which is one half of the selection period T1. Thus, a pulse voltage of −4 V/+4 V is applied to the liquid crystal layer 3*b* for B at the B pixel (1 ,1) during the non-selection period T2. As a result, the electric field generated at the liquid crystal layer 3*b* for B at the B pixel (1, 1) is made substantially zero during the non-selection period T2.

When the voltage applied to the cholesteric liquid crystal changes from VF100*b* (±24 V) to VFO (±4 V) to make the electric field substantially zero abruptly in the state in which the helical structure of the liquid crystal molecules is not completely decomposed, the liquid crystal molecules enters a helical state in which the helical axis is in a direction substantially parallel to the electrodes 17*b* and 19*b*. Thus a focal conic state is entered, in which incident light is transmitted. Thus, the liquid crystal layer 3*b* for B at the B pixel (1, 1) enters the focal conic state to transmit light. Alternatively, the cholesteric liquid crystal can be put in the focal conic state by applying a voltage VP100 (V) to generate a strong electric field in the liquid crystal layer and gradually removing the electric field thereafter as shown in FIG. 6.

The driving voltages described above are merely examples. The cholesteric liquid crystal in the liquid crystal layer 3*b* for B enters a selective reflection state (planar state) when a pulsed voltage of 30 to 35 V is applied between the electrodes 17*b* and 19*b* for an effective time of 20 ms at room temperature and enters a preferable transmitting state (focal conic state) when a pulsed voltage of 15 to 22 V is applied for an effective time of 20 ms.

By driving a green (G) pixel (1, 1) and a red (R) pixel (1, 1) in the same manner as for the B pixel (1, 1) described above, color display can be provided at a pixel (1,1) where the three pixels (1, 1) for B, G, and R are stacked one over another. The scanning electrodes 17*b*, 17*g*, and 17*r* in the first to n-th rows are driven in the so-called line sequential manner to rewrite data voltages at the data electrodes 19 on each row. Thus, display data can be output to all pixels ranging from the pixel (1, 1) up to a pixel (n, m) to achieve color display of one frame (display screen).

A half tone resulting from a mixture of the planar state and the focal conic state can be provided by applying an electric field of an intermediate intensity to a cholesteric liquid crystal and abruptly removing the electric field thereafter. Thus, full-color display can be achieved.

An example of a method of manufacturing the liquid crystal display element 1 will now be briefly described.

ITO transparent electrodes are formed on two polycarbonate (PC) film substrates cut to have longitudinal and transversal lengths of 10 (cm)×8 (cm), and they are patterned through etching to form electrodes (scanning electrodes 17 or data electrodes 19) in the form of stripes at a pitch of 0.24 mm on each substrate. Thus, electrodes in the form of stripes are formed on each of the two PC film substrates to allow QVGA display of 320×240 dots. Next, a polyimide type alignment film material is applied using spin coating on the transparent electrodes 17 and 19 in the form of stripes on two respective PC film substrates 7 and 9 to a thickness of about 700 Å. Next, the two PC film substrates 7 and 9 having the alignment film material applied thereon are baked for one hour in an oven to form alignment films. Then, an epoxy type seal material 21 is applied to a peripheral part of either of the PC film substrates 7 and 9 using a dispenser to form a wall having a predetermined height.

Next, spacers having a diameter of 4 μm (manufactured by SEKISUI FINE CHEMICAL) are dispersed on the other PC film substrate 9 or 7. Then, the two PC film substrates 7 and 9 are combined and heated for one hour at 160° C. to cure the seal material 21. Then, after injecting a cholesteric liquid crystal LCb for B using a vacuum injection process, the injection port is sealed with an epoxy type sealing material to fabricate a B display portion 6b. G and R display portions 6g and 6r are fabricated using the same method.

Next, as shown in FIG. 4, the B, G, and R display portions 6b, 6g, and 6r are stacked in the order listed from the side of a display surface. Then, a visible light absorbing layer 15 is disposed on a bottom surface of a bottom substrate 9r of the R display portion 6r. General purpose STN driver ICs in a TCP (tape carrier package) structure are then crimped to terminal parts of scanning electrodes 17 of the display portions 6b, 6g, and 6r for B, G, and R stacked one over another and terminal parts of data electrodes 19 thereof, and a power supply circuit and a control circuit 23 are further connected. Thus, a liquid crystal display element 1 capable of QVGA display is completed. Although not shown, electronic paper is completed by providing the liquid crystal display element 1 thus completed with an input/output device and a control device for exercising overall control of the element (neither of which is shown).

A description will now be made on the liquid crystal composition in the present mode for carrying out the invention fabricated using the above-described manufacturing method and having the configuration and operations as described above and display characteristics of the liquid crystal display element 1 having the same, the description including a comparison with comparative examples.

Figure 7A:
FIGS. 7A and 7C are illustrations showing composition ratios of materials included in liquid crystal compositions according to the related art.
Figure 7B:
Figure 7C:

First, the composition ratios of materials of liquid crystal compositions according to the related art used as comparative examples will be described using FIGS. 7A to 7C. FIG. 7A shows the composition ratio of a cholesteric liquid crystal for B according to the related art to be used in a liquid crystal layer for B. FIG. 7B shows the composition ratio of a cholesteric liquid crystal for G according to the related art to be used in a liquid crystal layer for G. FIG. 7C shows the composition ratio of a cholesteric liquid crystal for R according to the related art to be used in a liquid crystal layer for R.

The cholesteric liquid crystal for B according to the related art shown in FIG. 7A is produced by adding a chiral material CHr', which is an R-form, to a nematic liquid crystal LCn' having a predetermined weight. The content of the chiral material CHr' is 30 wt %. The nematic liquid crystal LCn' has $\Delta n=0.20$, $\Delta \epsilon=20$, and viscosity $\mu=37$(mPa·s) at room temperature. The chiral material CHr' has $\Delta n=0.29$ and $\Delta \epsilon=22$, and it is in the form of powder at room temperature. The cholesteric liquid crystal for B according to the related art thus produced causes selective reflection at a main wavelength $\lambda b$ of about 480 nm and has $\Delta n=0.23$.

The cholesteric liquid crystal for G according to the related art shown in FIG. 7B is produced by adding a chiral material CHl', which is an L-form, to a nematic liquid crystal LCn' having a predetermined weight. The content of the chiral material CHl' is 26 wt %. The nematic liquid crystal LCn' is the same as that in the cholesteric liquid crystal for B according to the related art. The chiral material CHl' has the same $\Delta n$ value and $\Delta \epsilon$ value as those of the chiral material CHr', and it is in the form of powder at room temperature. The cholesteric liquid crystal for G according to the related art thus produced causes selective reflection at a main wavelength $\lambda g$ of about 560 nm and has $\Delta n=0.22$.

The cholesteric liquid crystal for R according to the related art shown in FIG. 7C is produced by adding a chiral material CHr'', which is an R-form, to a nematic liquid crystal LCn' having a predetermined weight. The content of the chiral material CHr'' is 24 wt %. The nematic liquid crystal LCn' is the same as that in the cholesteric liquid crystal for B according to the related art. The chiral material CHr'' has $\Delta n=0.29$ and $\Delta \epsilon=25$, and it is in the form of powder at room temperature. The cholesteric liquid crystal for R according to the related art thus produced causes selective reflection at a main wavelength $\lambda r$ of about 610 nm and has $\Delta n=0.22$. Ordinary materials sold on the market are used as the nematic liquid crystal LCn' and the chiral materials, CHr', CHl' and so on.

Thus, the cholesteric liquid crystals for B and R according to the related art cause the same optical rotation (R) which is different from optical rotation (L) in the cholesteric liquid crystal for G according to the related art. In terms of the chiral material content, the cholesteric liquid crystal for G according to the related is higher than the cholesteric liquid crystal for R according to the related art, and the cholesteric liquid crystal for B according to the related is higher than the cholesteric liquid crystal for G according to the related art.

The cholesteric liquid crystals for B, G, and R according to the related art thus prepared are enclosed in liquid crystal layers of a comparative liquid crystal display element (not shown) having the same configuration as that of the liquid crystal display element 1 in the present mode for carrying out the invention.

Figure 8:
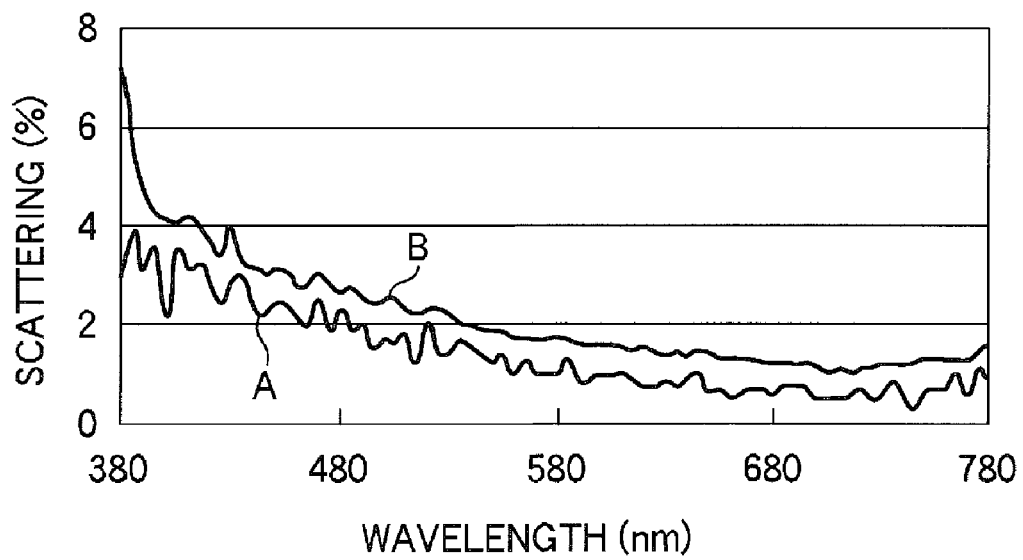
FIG. 8 is a graph showing reflectance (scattering) in a liquid crystal layer for R of the liquid crystal display element 1 in the mode for carrying out the invention in the focal conic state.
Figure 9:
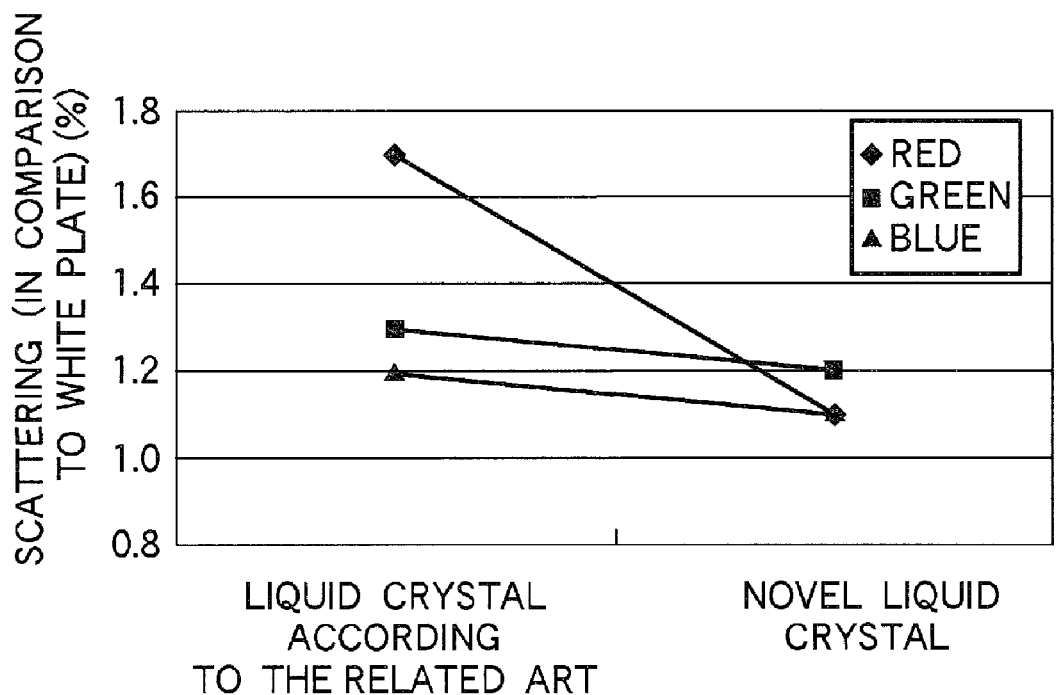
FIG. 9 is a graph showing an example of comparison of scattering in liquid crystal layers B, G, and R of the liquid crystal display element 1 in the mode for carrying out the invention and a liquid crystal display element according to the related art.

FIGS. 8 and 9 show the effect of improving display characteristics achieved by the liquid crystal display element 1 in the present mode for carrying out the invention in comparison to the comparative liquid crystal display element.

FIG. 8 shows reflectance (scattering) in the liquid crystal layer 3r for R in the focal conic state. The abscissa axis represents wavelengths (nm) of reflected light, and the ordinate axis represents scattering (%). The curve A in the figure represents scattering characteristics of the liquid crystal layer 3r for R of the liquid crystal display element 1 in the present mode for carrying out the invention, and the curve B in the figure represents scattering characteristics of the liquid crystal layer for R of the liquid crystal display element according to the related art. The liquid crystal layer 3r for R of the liquid crystal display element 1 in the present mode for carrying out the invention has a $\Delta n$ value of 0.23, and the liquid crystal layer for R of the liquid crystal display element according to the related art has a $\Delta n$ value of 0.29. That is, they have substantially equivalent values. However, as apparent from in FIG. 8, reflectance or so-called scattering in the liquid crystal layer 3r for R of the liquid crystal display element 1 in the present mode for carrying out the invention in the focal conic state is smaller than or about 30% to 60% of scattering in the liquid crystal layer for R according to the related art over the entire range of wavelengths under measurement.

FIG. 9 shows a comparison of scattering characteristics of the liquid crystal layers for B, G, and R of the liquid crystal display element 1 in the present mode for carrying out the invention and the liquid crystal display element according to the related art in the focal conic state. The liquid crystal display element 1 in the present mode for carrying out the invention (novel liquid crystal) and the liquid crystal display element according to the related art (conventional liquid crystal) are shown in the horizontal direction, and the ordinate axis represents scattering (in comparison to a white plate) (%). The symbols "♦" in the graph represent scattering characteristics of the liquid crystal layers for R. The symbols "■" in the graph represent scattering characteristics of the liquid crystal layers for G. The symbols "▲" in the graph represent scattering characteristics of the liquid crystal layers for G. It is apparent from FIG. 9 that the liquid crystal display element 1 in the present mode for carrying out the invention has less scattering in the focal conic state compared to the liquid crystal display element according to the related art in all of the liquid crystal layers for B, G, and R. Specifically, scattering in the liquid crystal layer 3r for R is about 60% less than that in the related art. The liquid crystal layers 3g and 3b for G and B also have reduced scattering which is about 10% less than that in the related art. The reduced scattering in the liquid crystal layer for B is attributable to the fact that the Δn value of the chiral material is smaller than the Δn value of the nematic liquid crystal in the liquid crystal display element 1 in the present mode for carrying out the invention. It has been empirically discovered that such a relationship between the Δn values allows a more preferable reduction of scattering.

Reflectance is measured by measuring luminous reflectance (Y value) using a reflection type spectrophotometer. Higher transparency can be achieved to allow preferable display of black, the smaller the Y value when color is extinguished. A color can be more preferably displayed, the greater the Y value when the color is rendered. Contrast is calculated as (Y value in the planar state/Y value in the focal conic state).

The present mode for carrying out the invention provides the following effects and advantages.

First, liquid crystal molecules are twisted more strongly to result in a shorter helical pitch, the greater the content of a chiral material. Thus, light reflected in the planar state has a shorter wavelength. Therefore, a cholesteric liquid crystal according to the related art has a lower chiral material content when used for G than when used for B and has a lower chiral material content when used for R than when used for G (see FIGS. 7A to 7C).

However, in the case of a liquid crystal layer for R using a cholesteric liquid crystal having a relatively low chiral material content as shown in FIG. 1C, a problem arises in that the helical axis direction and the helical structure of liquid crystal molecules 33b have great variations in a bulk region.

Under the circumstance, in the present mode for carrying out the invention, the liquid crystal layer 43r for R employs the cholesteric liquid crystal LCr for R (see FIG. 2C) having a chiral material content higher than the chiral material content of the cholesteric liquid crystal LCb for B (see FIG. 2A) which can propagate an alignment regulating force up to a bulk region. As a result, an alignment regulating force can be propagated up to a bulk region to produce a sufficient focal conic state which is substantially uniform in the thickness direction of the cell. The directors of the liquid crystal molecules 33 of the liquid crystal layer 43r for R are substantially perpendicular to the substrate surfaces of the top and bottom substrates 7r and 9r not only in the neighborhood of the interfaces of the substrates but also in the bulk region. The directors are sequentially rotated in in-plane directions of the substrates to form a helical structure, and the helical axis of the helical structure is substantially parallel to the substrate surfaces.

Further, since the chiral material contained in the cholesteric liquid crystal LCr for R includes two types of optical isomers having different optical rotations at a predetermined ratio, a helical pitch required for selectively reflecting red can be obtained.

As will be apparent from a comparison between FIGS. 2A to 2C and 7A to 7C, in the liquid crystal display element 1 in the present mode for carrying out the invention, the content of the chiral material is rendered higher in the liquid crystal layer for G than in the liquid crystal layer for B and rendered higher in the liquid crystal layer for R than in the liquid crystal layer for G, which is completely contrary to compositions according to the related art. Further, the liquid crystal layer for R for reflecting light having the greatest wavelength includes chiral materials which are an R-form and an L-form. The content of the chiral material is rendered high as thus described in the liquid crystal layer for R in which significant light scattering otherwise occurs in the focal conic state, whereby light scattering in the liquid crystal layer for R can be uniformly reduced over a wide wavelength range. Therefore, the color balance and the contrast of the liquid crystal layers B, G, and R can be sufficiently improved. Further, a cholesteric liquid crystal formed by a nematic liquid crystal material having refractive index anisotropy or Δn value greater than the Δn value of a chiral material is used, which allows the color purity and contrast of displayed colors to be improved. Further, since driving voltages for the liquid crystal layers B, G, and R can be preferably made equal to each other, the configuration of the driving circuit of the liquid crystal display element can be made simple.

As described above, in a cholesteric liquid crystal in the present mode for carrying out the invention, reflection of noises in the focal conic state is suppressed in a preferable manner, and a sufficient improvement can therefore be achieved in color purity and contrast. Therefore, the liquid crystal display element 1 and the electronic paper employing the cholesteric liquid crystal can display a color image having high sharpness and contrast and a wide color reproduction range.

The liquid crystal composition, liquid crystal display element, and electronic paper according to the invention are not limited to the above-described mode of carrying out the invention.

For example, what is required for the composition ratio of the cholesteric liquid crystals used in the liquid crystal display element 1 is that the content of the chiral material in the cholesteric liquid crystal for R is highest and that the cholesteric liquid crystal for R includes two types of optical isomers (R-form and L-form chiral materials) having different optical rotations. Therefore, the cholesteric liquid crystal for G may include only either R-form or L-form chiral material.

The composition ratios of the cholesteric liquid crystals LCb, LCg, and LCr shown in the above-described mode for carrying out the invention do not constitute a limitation. The contents x of the chiral materials contained in the nematic liquid crystals ($0.18 \leq \Delta n \leq 0.24$) of the cholesteric liquid crystals forming the liquid crystal layers for B, G, and R preferably satisfy 20 wt % $\leq x \leq$ 60 wt %. Although a variety of nematic liquid crystals known in the related art may be used, the values of the refractive index anisotropy Δn of the nematic liquid crystals preferably satisfy $0.18 \leq \Delta n \leq 0.24$, and the dielectric constant anisotropy Δε of the same preferably satisfies $20 \leq \Delta \epsilon \leq 50$. When the dielectric constant anisotropy Δε of a nematic liquid crystal is 20 or more, the range of selection of usable chiral materials will be increased.

The dielectric constant anisotropy Δε of the cholesteric liquid crystals preferably satisfies $20 \leq \Delta \epsilon \leq 50$. When the dielectric constant anisotropy Δε of the cholesteric liquid crystals is excessively lower than the above-described range, the driving voltages are increased. When the above-described range is exceeded too much conversely, the stability and reliability of the liquid crystal display element is degraded. As a result, the liquid crystal display element will be liable to image defects and noises on images. The cholesteric liquid crystals desirably have a specific resistance R in the range of $10^{10} \leq R \leq 10^{13}$ (Ω·cm) and desirably have a dielectric constant $\epsilon$ satisfying $5 \leq \epsilon \leq 15$ in the planar state and satisfying $10 \leq \epsilon \leq 25$ in the focal conic state. Desirably, they have viscosity $\mu$ in the range of $20 \leq \mu \leq 1200$ (mPa·s) at room temperature because lower viscosity allows higher suppression of a voltage increase and a reduction in contrast at low temperatures.

What is claimed is:

1. A liquid crystal display element comprising:
   a first liquid crystal layer having a first chiral material contained in a nematic liquid crystal to form a cholesteric phase such that light having a first wavelength is reflected in a planar state; and
   a second liquid crystal layer having a second chiral material contained in a nematic liquid crystal at a content higher than the content of the first chiral material to form a cholesteric phase such that light having a second wavelength longer than the first wavelength is reflected in the planar state.

2. A liquid crystal display element according to claim 1, wherein the second chiral material includes two types of optical isomers having different optical rotations.

3. A liquid crystal display element according to claim 1, further comprising a third liquid crystal layer having a third chiral material contained in a nematic liquid crystal at a content higher than the content of the second chiral material to form a cholesteric phase such that light having a third wavelength longer than the second wavelength is reflected in the planar state.

4. A liquid crystal display element according to claim 3, wherein the third chiral material includes two types of optical isomers having different optical rotations.

5. A liquid crystal display element according to claim 3, wherein the light having the first wavelength is blue; the light having the second wavelength is green; and the light having the third wavelength is red.

6. A liquid crystal display element according to claim 3, wherein each of the first to third liquid crystal layers is enclosed between a pair of different substrates.

7. A liquid crystal display element according to claim 3, wherein the first liquid crystal layer, the second liquid crystal layer, and the third liquid crystal layer are stacked in this order from the side of a display surface.

8. A liquid crystal display element according to claim 3, wherein optical rotation in the second liquid crystal layer in the planar state is different from optical rotation in the first and third liquid crystal layers.

9. A liquid crystal display element according to claim 3, wherein each of the first to third liquid crystal layers has a cell gap d satisfying $3~\mu m \leq d \leq 6~\mu m$.

10. A liquid crystal display element according to claim 3, further comprising a light absorbing layer for absorbing light is disposed on a side of the pair of substrates enclosing the third liquid crystal layer opposite to a light entrance side thereof such that black is displayed when all of the first to third liquid crystal layers are in a focal conic state.

11. A liquid crystal display element according to claim 3, wherein the content x of the first to third chiral materials satisfies 20 wt % $\leq$ x $\leq$ 60 wt %.

12. A liquid crystal display element according to claim 1, wherein the value of refractive index anisotropy $\Delta n$ of the nematic liquid crystals satisfies $0.18 \leq \Delta n \leq 0.24$.

13. A liquid crystal display element according to claim 12, wherein refractive index anisotropy $\Delta n$ of the first to third chiral materials is smaller than the $\Delta n$ of the nematic liquid crystals.

14. Electronic paper comprising a display portion for displaying a predetermined image, wherein the display portion has a liquid crystal display element according to claim 1.

* * * * *